United States Patent [19]

Yamawaki

[11] Patent Number: 4,918,609
[45] Date of Patent: Apr. 17, 1990

[54] SATELLITE-BASED POSITION-DETERMINING SYSTEM

[76] Inventor: Koji Yamawaki, 2052-1, Wakasiba-cho, Riugasaki-shi, Ibaragi, Japan

[21] Appl. No.: 255,248
[22] Filed: Oct. 11, 1988
[51] Int. Cl.⁴ .............................................. G01S 5/02
[52] U.S. Cl. .................................... 364/449; 342/357
[58] Field of Search ........... 364/443, 449, 569, 571.01; 73/178 R; 342/357, 358, 451

[56] References Cited

U.S. PATENT DOCUMENTS

| | | | |
|---|---|---|---|
| 4,077,005 | 2/1978 | Bishop | 342/357 |
| 4,359,733 | 11/1982 | O'Neill | 364/449 |
| 4,652,884 | 3/1987 | Starker | 342/357 |
| 4,731,613 | 3/1988 | Endo et al. | 364/450 |
| 4,814,711 | 3/1989 | Olsen et al. | 364/449 |

Primary Examiner—Gary Chin
Attorney, Agent, or Firm—Armstrong, Nikaido, Marmelstein, Kubovcik & Murray

[57] ABSTRACT

A satellite-based position-determining system comprises at least two satellites deployed in geosynchronous orbit and equipped with a receiver, transmitter and clock and a user's equipment of unknown position equipped with a clock and a receiver and transmitter for communications with said satellites. At least one satellite and the user's equipment emit range-finding signals based on their own clocks, and each of them receives the other's range-finding signal and measures the time period from the emission of its own range-finding signal to the reception of the other's range-finding signal. Time errors of both clocks are calculated from the above time periods in order to synchronize both the clocks and the position of the user's equipment is determined.

5 Claims, 12 Drawing Sheets

FIG. 5

| SEGMENT | MAJOR FUNCTION | NAVIGATION MODE | COMMUNICATION MODE | CLOCK SYNCHRONIZATION MODE | SATELLITE DATA UPDATE MODE | SATELLITE CONTROL MODE |
|---|---|---|---|---|---|---|
| USER EQUIPMENT | SATELLITE #1(or#2,or#3) PN SIGNAL RECEIVING/PROCESSING | O ⎫ | | | | |
| | SATELLITE #1(or#2,or#3) PN SIGNAL RECEIVING/PROCESSING | O ⎬ ONE OF THESE | O | | | |
| | SATELLITE #1(or#2,or#3) PN SIGNAL RECEIVING/PROCESSING | O ⎭ | O | | | |
| | GROUND STATION PN SIGNAL RECEIVING/PROCESSING | | O | | | |
| | USER PN SIGNAL TRANSMITTING | | O | | | |
| SATELLITE | PN SIGNAL TRANSMITTING | O | | O | | |
| | PN SIGNAL RELAY | | O | | | |
| | PN SIGNAL RECEIVING/PROCESSING | O | | O | O | O |
| | SATELLITE DATA PROCESSING/UPDATING | | | | O | O |
| GROUND STATION | PN SIGNAL PROCESSING | | O | O | O | O |
| | PN SIGNAL RECEIVING/PROCESSING | | O | O | O | O |
| | SATELLITE DATA PROCESSING | | | | O | |
| | SATELLITE TELEMETRY/COMMAND PROCESSING | | | | | O |
| | USER MESSAGE NETWORK SERVICE | | O | | | |

SATELLITE-BASED POSITION-DETERMINING SYSTEM

BACKGROUND OF THE INVENTION

1. Field of the Invention

This invention is related to radio navigation systems using satellites. To be more precise, it is related to satellite-based position-determining systems which use satellites for determining the position of aircraft, automobile, ship, building and the like in movement or at a standstill on or near the earth's surface.

2. Description of the Prior Art

Various methods are known for determining the geographical position of aircraft, ship and the like. With the advance of space technology, systems using artificial satellites have been introduced recently. These systems have superior features over other types of system, such as insusceptibility to influences of the topography because the signal to be received comes from the sky. Of various position determining systems using satellites and proposed in the past, important systems are summarized here.

I. NNSS (Navy Navigation Satellite System)

This system makes use of the principle that the receiving frequency of the radio wave from a satellite is varied by the Doppler effect. This position-determining method was employed in the U.S. Navy's navigation satellite system (NNSS) which is used as a sole operative system at present for ship's navigation and other applications such as precise surveying. The NNSS is an all-weather, passive (namely, no radio wave is sent out from the user's side) navigation system and provides the users on the earth's surface with position-determining information on a worldwide scale.

Out of the necessity to heighten the Doppler frequency effect, however, the satellites must be on a polar orbit as low as about 1000 km of altitude. Therefore, the user can observe a satellite for as short as about 10 minutes, yet calculating his position requires all the Doppler curves ordinarily obtainable during one pass. At present, 5 NNSS satellites are deployed and the interval between observations is 90 minutes on an average. As a result, the users of this system are ships or other vehicles of slow dynamics alone.

II. NAVSTAR GPS (Navigation Satellite Timing and Ranging Global Positioning System)

In this system, a total of 6 NDS (Navigation Development Satellite) are deployed on two orbits 120° apart, 3 satellites on each orbit and at intervals of 40°. In this deployment, at least 4 satellites come within the same field of view for at least 4 hours a day all over the world. According to the plan, the number of NDS is increased gradually (in phase II) from the initial 6 and position determination will be possible periodically in 3 dimensions and almost continuously in 2 dimensions. It is intended that by the beginning of 1990s when all the satellites will have been deployed, a total of 18 practical type navigation satellites are placed on three orbits each having an angle of inclination from the equator of 55° and 120° apart each other; 6 satellites at a constant interval on each orbit.

Concept of GPS

If the transmitting and receiving sides are both equipped with an ideally precise clock, the distance $\rho$ between the transmitting and receiving sides is derived by multiplying the difference between the reception time t and the transmission time t', namely, the signal propagation time, by the velocity of light C;

$$\rho = C(t - t') \tag{1.1}$$

For the calculation to be possible, it is an essential prerequisite that the clocks are both in precise synchronism with a common reference time (GPS system time). Expression (1.1) represents a sphere with the radius $\rho$ and the center at the position of the NDS at the time t'.

That is, if simultaneous measurements could be made with 3 NDS at the time t, 3 spheres are obtained and the 3 dimensional position of the user at the time t is determined as the intersect of the three spheres. The position-determining calculation in the global position-determining satellite system GPS is based on such a simple geometrical principle. To use this principle in practice, however, various conditions must be satisfied. Firstly, for this position-determining calculation to be possible, the user must know the exact transmitting and receiving time. There is not an ideal clock capable of indicating the exact time, however, any clock we may use is always attended with a deviation in time. In addition, the user must know the position of the NDS at the transmitting time t'. In Expression (1.1), the effect of the atmosphere on radio wave propagation is ignored. Accordingly, Expression (1.1) is amended considering these actual conditions.

Let $\Delta t$ and $\Delta t'$ be the respective deviations of the clocks of the user and NDS from the GPS system time, namely, the synchronization errors. Then, the value of the range the user calculates can be written as follows:

$$\begin{aligned}\bar{\rho} &= C[(t + \Delta t) - (t' + \Delta t')] \\ &= C(t - t') + C(\Delta t - \Delta t') \\ &= \rho + C\Delta tA + C(\Delta t - \Delta t')\end{aligned} \tag{1.2}$$

where $\Delta tA$ is the radio wave propagation delay time in the atmosphere. In the above expression, $t + \Delta t$ and $t' + \Delta t'$ are both indicated times. $\bar{\rho}$ defined in Expression (1.2) is not an ordinary geometrical distance but is called a pseudo range because the distance error due to the time deviations of both clocks is added as the third term of the right side.

Expression (1.2) can be rewritten using the components of the position vectors of the NDS and user relative to an orthogonal reference coordinate system; $sv = (Xsv, Ysv, Zsv)^T$ and $= (x, y, z)$ (T denotes transposition), as follows:

$$\bar{\rho} = \sqrt{(X-Xsv)^2 + (Y-Ysv)^2 + (Z-Zsv)^2} + C\Delta tA + C(\Delta t - \Delta t') \tag{2.3}$$

In the GPS, a highly stable oscillator of an atomic standard of frequency is used as the on-board clock. In addition, the user can use the NDS clock's time-correcting parameter contained in the GPS navigation signal in order to estimate the period error $\Delta t'$ in the transmitting time within an accuracy of about 9 ns (corresponding to a distance error of about 3 meters). And, information on the orbit is also contained in the navigation signal to calculate the position vector $sv(t')$ of the NDS at the estimated transmitting time t'.

It is thought that almost all users are equipped with a low-cost clock with a lower accuracy than that equipped in the NDS. Suppose $\Delta t$ to be also an unknown in such a case, and solution is possible with respect to $\Delta t$ and the position vector of the receiving point of the user if a pseudo range finding observation is made with a total of 4 NDS. That is, if we make an observation of the pseudo ranges to a total of 4 NDS and enter the observation results in Expression (2.3), we can derive a solution with respect to the receiving point's position vector and $\Delta t$. Since a period error of 1 $\mu$s yields an error in range finding of about 300 meters as is obvious from Expression (1.2), one can see that this approach to time error is very important. In the GPS, however, there is a drawback that no communications functions are provided and the user can only determine his position.

III. GEOSTAR (A communications system proposed by Dr. O'Niel of the U.S.)

This is a system for determining the present position of most vehicles traveling on the land or in the air of the earth, especially of aircraft. This system comprises at least 3 satellites deployed at intervals of 45° in geosynchronous orbit. Satellites in geosynchronous orbit have a period of about 24 hours and an altitude of 36000 kilometers.

This system is outlined below, using FIGS. 11 and 12.

At the time $t_0$, the ground station GS transmits an inquiry signal at the carrier frequency $f_1$ toward the satellite $S_2$. The repeater circuit on board the satellite $S_2$ retransmits the inquiry signal toward all the aircraft within the effective range of this system. This retransmission takes place using one or more antennas on board the satellite $S_2$. When the repeater on board the user A receives the inquiry signal via the satellite $S_2$ (FIG. 11), the repeater responds with a beacon frequency signal at the carrier frequency $f_2$ if it is in operation.

That beacon signal is received by the 3 satellites $S_1$, $S_2$ and $S_3$. The 3 satellites each have a repeater circuit which operates at the carrier frequency $f_2$, and the satellite $S_2$ relays the beacon signals coming via $S_1$ and $S_3$ to the ground station GS in addition to the beacon signal coming directly from A (FIG. 12). The ground station GS measures the arrival times $t_1$, $t_2$ and $t_3$ of the returned signals, extracts information from the signals by demodulation, and calculates the present position of the user. The results are given as the user's longitude, latitude and altitude over a fixed reference level (mean sea level). In the GEOSTER, no clock is on board for range finding and there is no problem with clock errors as in the case of GPS. In addition, GEOSTER has telecommunications capabilities.

Since NNSS uses the Doppler effect, it has intrinsically a low measurement accuracy and the user's traveling speed makes up an error factor in position determination. Therefore, there are problems such as limited applicability only to vessels or other vehicles traveling at a low speed, unavailability outside limited periods (a low frequency at which observation is possible), and the like. For the GPS described above, 18 or more satellites are necessary for continuous position determination. In addition, a stability as high as $10^{-12}$ to $10^{-13}$ is required for the satellite clock for position determination with an accuracy of the order of 10 meters.

For GEOSTER, no precise clock is needed on the user nor satellites. However, the necessity of communications with both the satellites and ground station at each position determination does not allow application to a great number of users or navigation requiring continuous position determination, out of the limitation in radio communication capacity. Moreover, the user must wait to receive the position information calculated at the ground station before he can see his position; there is a delay of about 0.5 seconds before he gets this information. For reasons such as insufficient strength of the radio wave the user emits or a declined reception sensitivity due to the user antenna's improper attitude toward the satellites, there may be a case in which it is impossible that the three satellites each receive the radio wave and relay it to the ground station where the position of the user is to be calculated.

This points out the problem that this system can not be used with high reliability for control and navigation of aircraft because of the uncertainty and delay in acquisition of position information.

SUMMARY OF THE INVENTION

With the aim of getting over the drawbacks intrinsic in the 3 systems described above, this invention proposes a position-determining system with a minimum number of artificial satellites, with a higher reliability attained by equipping the satellites, users and ground station with a clock and effecting synchronism among these clocks by a very simple means without requiring particular accuracy of the clocks, and with communications capability as well.

To solve the problems described above, this invention takes up the following two means:

The first means is a satellite-based position-determining system consisting of at least two satellites deployed in geosynchronous orbit and equipped with a receiver, transmitter and clock and of a user's equipment of unknown position equipped with a clock and a receiver and transmitter for communications with said satellites; through a stage on which at least one satellite and the user's equipment emit range-finding signals based on their own clocks in order to determine the position of the user's equipment, and a stage on which each of them receives the other's range-finding signal and measures the time period from the emission of its own range-finding signal to the reception of the other's range-finding signal, the time errors of both clocks are calculated from the above time periods in order to synchronize the both clocks and the position of the user's equipment is determined.

The second means is a satellite-based position-determining system consisting of a ground station equipped with a receiver, transmitter and clock, at least two satellites deployed in geosynchronous orbit and equipped with a receiver, transmitter and clock, and a user's equipment of unknown position equipped with a clock and a receiver and transmitter for communications with above satellites; through a stage on which at least one satellite and the user's equipment emit range-finding signals based on their own clocks for position determination, a stage on which each of them receives the other's range-finding signal and arrival times ($\Delta$ts, $\Delta$tu) of both range-finding signals are measured based on the respective clock times, and a stage on which the time errors of the clocks of both the satellite and user's equipment are calculated from the above arrival times for clock synchronization and the position of the user's equipment is determined, the error of the clock in the user's equipment is automatically corrected using the tendency to divergence of the position measured with the user's equipment at a standstill.

BRIEF DESCRIPTION OF THE DRAWINGS

The above and other objects, features and advantages of the present invention will become more apparent from the following description of the preferred embodiment thereof, taken in conjunction with the accompanying drawings, in which like reference numerals denote like elements and, of which:

FIG. 5 is a table for indicating the operation of the system functions according to this invention;

DESCRIPTION OF THE PREFERRED EMBODIMENT

The present invention will be described hereinunder in more detail with reference to the accompanying drawings.

Figure 1:
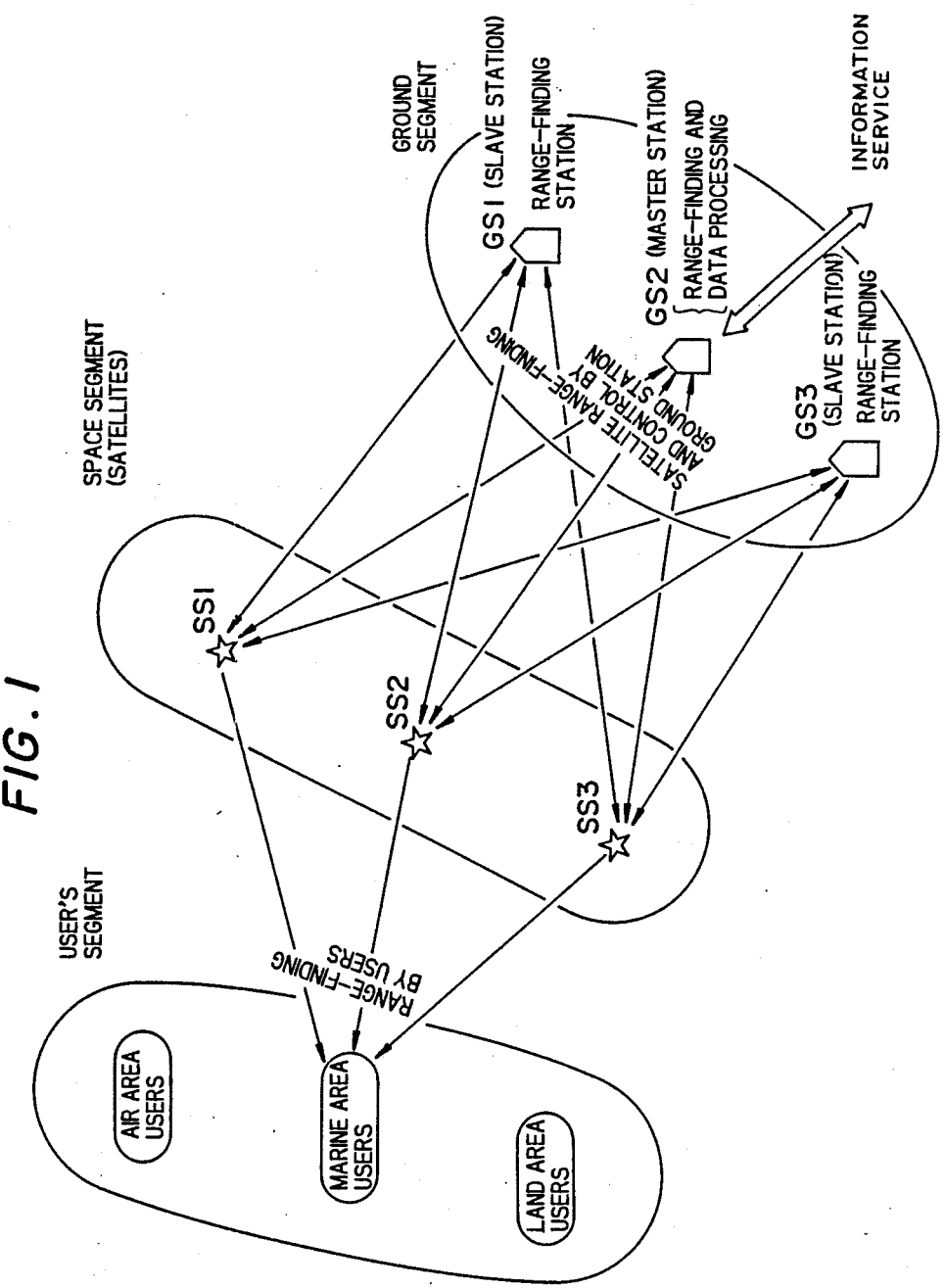
FIG. 1 is a schematic diagram of a position-determining system according to this invention.

FIG. 1 is a schematic diagram showing an example of the concept of a position-determining system according to this invention. This system comprises a lot of user groups in the air, on the ocean, and on the land and the users can communicate with three satellites SS1, SS2 and SS3. Three satellites can communicate with a ground system comprising a master station GS2 and slave stations GS1 and GS3. The master station GS2 plays the main role of this system, such as determination of the satellite position and various kinds of information service to the user. The slave stations GS1 and GS3 cooperate under control of the master station GS2 in determining the satellite position.

The three satellites and user are each equipped with an accurate clock, however, these clocks need not be extra accurate as used in GPS satellites because they can be synchronized and calibrated at any time based on the principle described below. The clock bias between a satellite and the user can be obtained through radio communications and based on the following principle.

Principle of Clock Bias Measurement

The following is a description of the calculation of clock bias. (See FIG. 2) Assume first that the position of the satellite is known and the satellite clock and ground station clock are already synchronized. This can be effected by well known techniques and their description is omitted here because it is out of the purport of this invention.

Figure 2:
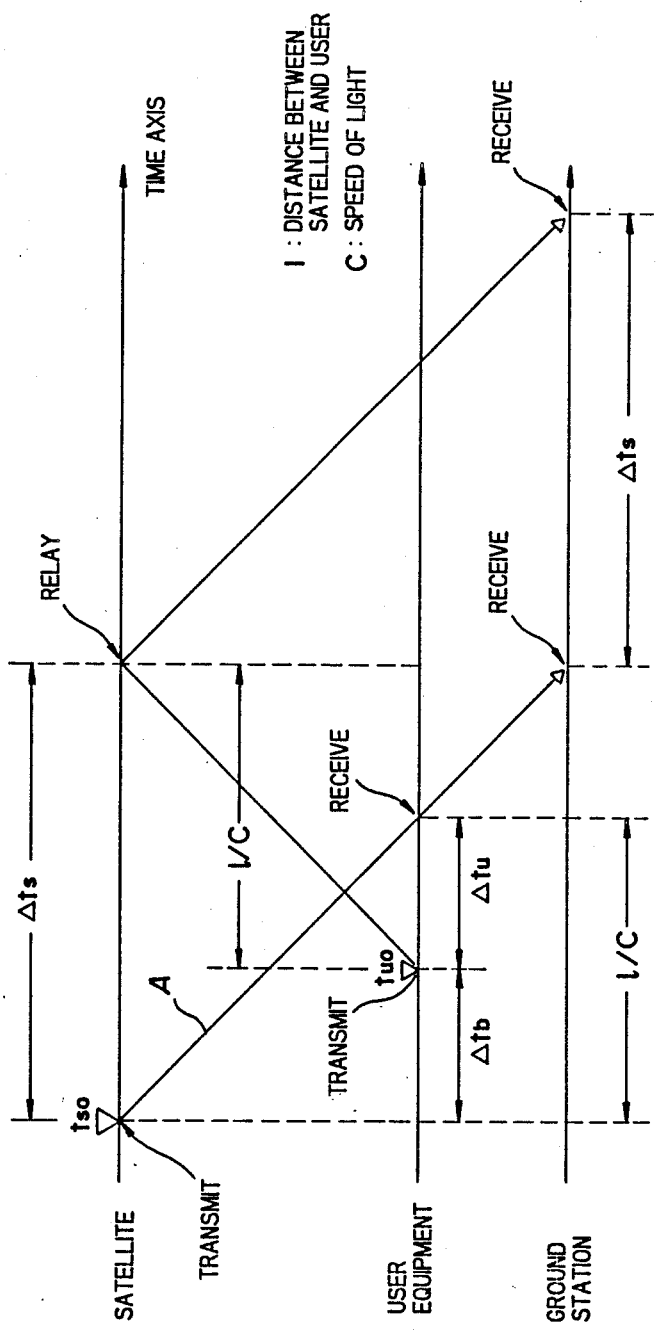
FIG. 2 shows the principle of a system according to this invention.
Figure 3A:
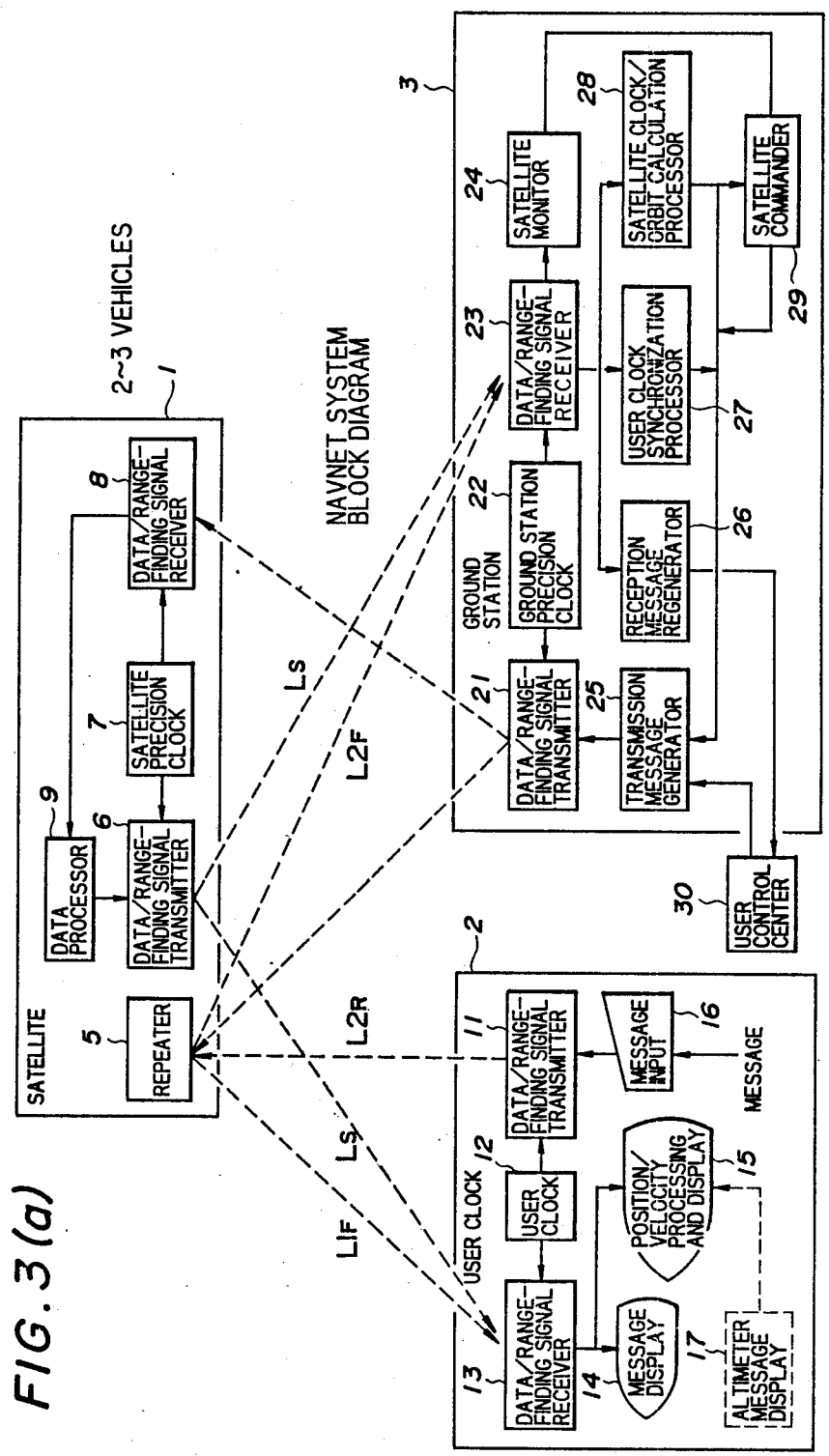
FIGS. 3 (a), 3 (b), 3 (c) and 3 (d) are functional block diagrams of a system according to this invention.
Figure 3B:
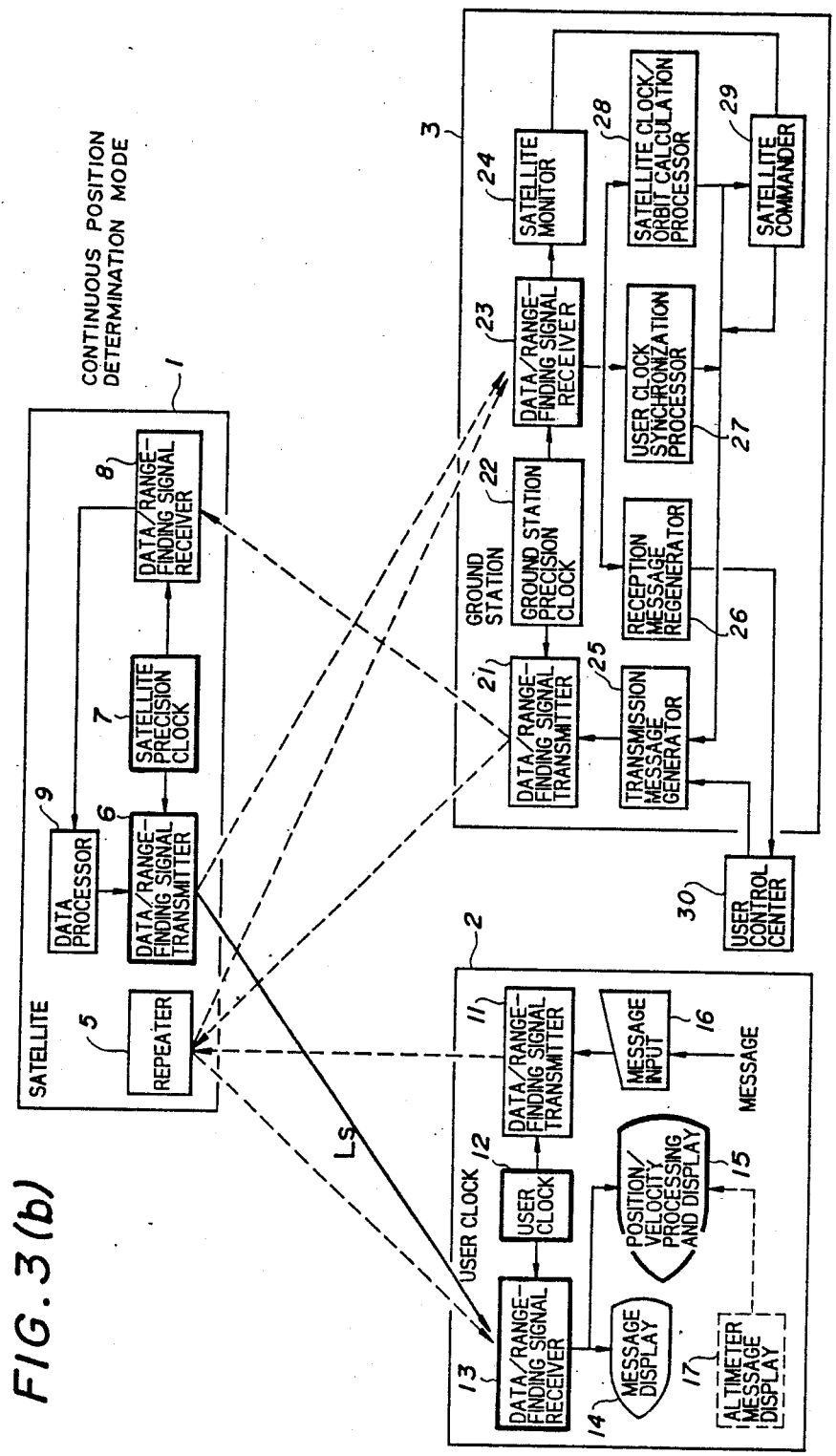
Figure 3C:
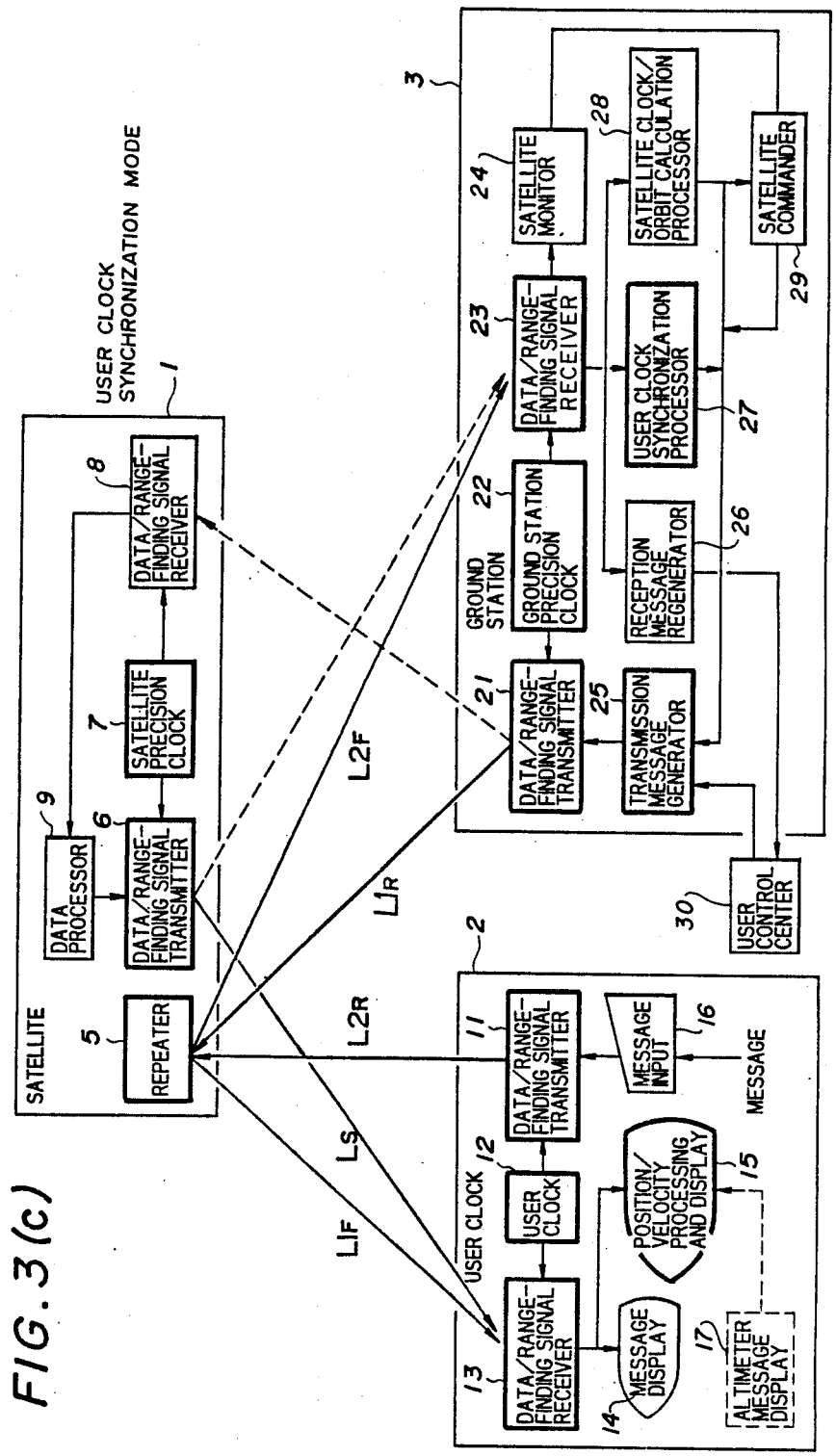
Figure 3D:
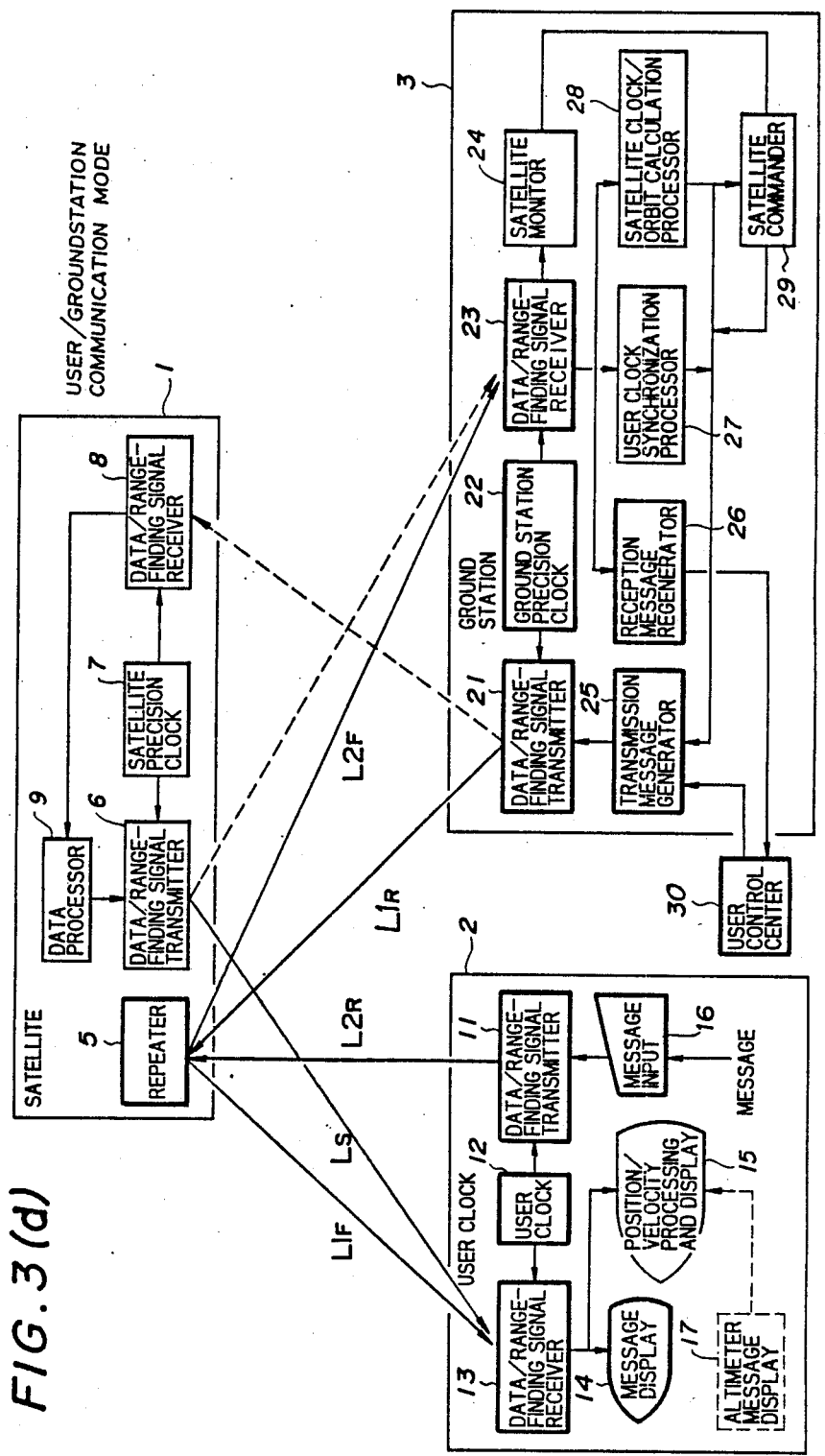

FIG. 2 shows the synchronization method. The satellite emits a radio wave A toward the user and ground station (the user and ground station are in different bearings from the satellite) at a time point tso indicated by its own clock, and the ground station and user receive it. The user emits a radio wave toward the satellite as well as toward the ground station at a time point tuo indicated by the user's own clock. Then, the ground station calculates the difference $\Delta ts$ between the arrival times of the range-finding signals from the satellite and user. This $\Delta ts$ is sent from the ground station to the user via the satellite.

Using FIG. 2, the user calculates $\Delta t_B$ (clock bias) from $\Delta ts$. That is, $\Delta ts = l/C + \Delta t_B$, $\Delta tu = l/C - \Delta t_B$, where $l$ = the distance between the satellite and user and $C$ = the velocity of light. Hence, the relationship $\Delta t_B = (\Delta ts - \Delta tu)/2$ holds and the user can obtain the clock bias $\Delta t_B$ between the satellite and user. The communications between the ground and satellite are also used for clock synchronization between the ground and the satellite and for satellite position determination.

Though movement of the user constitutes an error factor in the derivation of the clock bias $\Delta t_B$ described above, the user can usually determine his speed from the Doppler shift in the radio wave used as the range-finding signal from the satellite. For users traveling rapidly, this speed information may be used to augment the accuracy of clock bias estimation.

Though the measurement of $\Delta ts$ at the ground station is used here as the means of synchronization, this principle is also applicable with measurement of $\Delta ts$ only between the user and satellite. That is, $\Delta ts$ can be measured at the satellite. In the latter method, however, the satellite must measure this $\Delta ts$ for many users and an increase of the hardware on board the satellite results. Therefore, it was assumed from the point of practical view that the measurement be made at the ground station via the satellite. Nevertheless, measurement of $\Delta ts$ between the user and satellite is still practical for user groups with a small number of members, and the same principle as the clock synchronization between the satellite and ground station also holds in this case.

System Configuration

FIG. 3 is a hardware block diagram showing the functions of the satellites, user, master station and slave station of a system based on the principle of this invention described above. Satellite 1 is equipped with a repeater 5, data/range-finding signal transmitter 6, satellite precision clock 7, data/range-finding signal receiver 8 and satellite data processor/producer 9, in addition to a usual satellite-operating system. Repeater 5 has a function to simply relay the transmission of data/range-finding signal from user 2 to ground station 3 and the transmission from ground station 3 to user 2. Data/range-finding signal transmitter 6 emits data and range-finding signals to user 2 and ground station 3.

Satellite precision clock 7 usually consists of an atomic clock. Because it is on board satellite 1 which is geosynchronous and which ground station 3 can always track, it can be calibrated for its deviation from ground station 3 with a necessary frequency depending on the required accuracy. As a result, quartz oscillators, which have a long service life, may be used instead of atomic clocks which have problems in service life and cost. Data/range-finding signal receiver 8 receives the signal from ground station 3. Satellite data processor/producer 9 has a central processing unit (CPU) which does processing and arithmetic operations on various data.

The processed data are emitted toward user 2 and ground station 3.

User 2 consists of data/range-finding signal transmitter 11, user clock 12, data/range-finding signal receiver 13, reception message regenerative display 14, position/velocity processing display 15 and transmission message input generator 16. If user 2 is an aircraft, it is equipped with an altimater 17 as well.

Data/range finding signal transmitter 11 transmits a range-finding signal to ground station 3 via satellite 1 in order to measure and update the clock bias $\Delta t_B$ of the user system, and transmission takes place at certain time intervals depending on the required accuracy of position determination at the user system. The operator can set the time interval between transmissions by operating the switch attached on display 15. The range-finding signal sent to ground station 3 can provide message transmission capability; for example, a message entered by the operator from the keyboard of transmission message input generator 16 can be mixed in the range-finding signal by data/range-finding signal transmitter 11.

User clock 12 is, for example, an atomic or quartz clock owned by user 2. Data/range-finding signal receiver 13 is a receiver for reception of data/range-finding signal from data/range-finding signal transmitter 6 or from repeater 5. Data/range-finding signal receiver 13 does preprocessing to derive satellite-user distance information, namely, the time taken for the radio wave to arrive, and extract the mixed satellite orbit data from the data/range-finding signals from data/range-finding signal transmitters 6 of at least two satellites, and extract messages and the data $\Delta ts$ for derivation of the user clock bias $\Delta tb$ from the signal from ground station 3 via repeater 5.

Reception message regenerative display 14 receives a signal from data/range-finding signal receiver 13 and displays the received message. Position/velocity processing display 15 displays the measured results on a CRT, LCD or the like. A navigator on an automobile, for example, displays roads and buildings to inform the driver of his present position.

Altimeter 17 is to be on board an aircraft or the like and measures the altitude from the earth's surface. Combination with the data measured by this system allows accurate position determination. Accuracies from $10^{-9}$ to $10^{-10}$ suffice for user clock 12. Ground station 3 comprises a master station and two slave stations and consists of data/range-finding signal transmitter 21, ground station precision clock 22, data/range-finding signal receiver 23, satellite monitor 24, transmission message generator 25, reception message regenerator 26, user clock synchronization processor 27, satellite clock/orbit calculation processor 28, satellite commander 29, user control center 30 and others.

Data/range-finding signal transmitter 21 sends data and range-finding signals to repeater 5 and data/range-finding signal receiver 8 of satellite 1. It is desirable that ground station precision clock 22 is an accurate atomic clock with a high precision of the order of $10^{-12}$ to $10^{-13}$, however, operation is still possible with precisions of the order of $10^{-11}$. Data/range-finding signal receiver 23 is for receiving signals from repeater 5 and data/range-finding signal transmitter 6 of satellite 1. Satellite monitor 24 maintains the orbit and hardware of satellite 1. Transmission message generator 25 is for generating messages to inform user 2 of various kinds of information.

User control center 30 holds various kinds of information provided by and to be supplied to users and exchanges information with user-related facilities. Transmission message generator 25 has the capability of sending messages or $\Delta ts$ to the user. Reception message regenerator 26 is for regenerating the contents of a signal from user 2 and supplying them to user controller 30. User clock synchronization processor 27 synchronizes user clock 12, satellite clock 7 and ground station clock 22 by measuring respective time errors periodically or on request from the user. Satellite clock/orbit calculation processor 28 calculates the errors in orbit, position and clock of satellites.

Satellite commander 29 is the part for correction and maintenance of satellite orbit and control of satellites.

The dotted lines L1F, Ls, L2R, L1R, L2F, Ls and Ls denote the flow of carrier waves.

Modes of System

Figure 4:
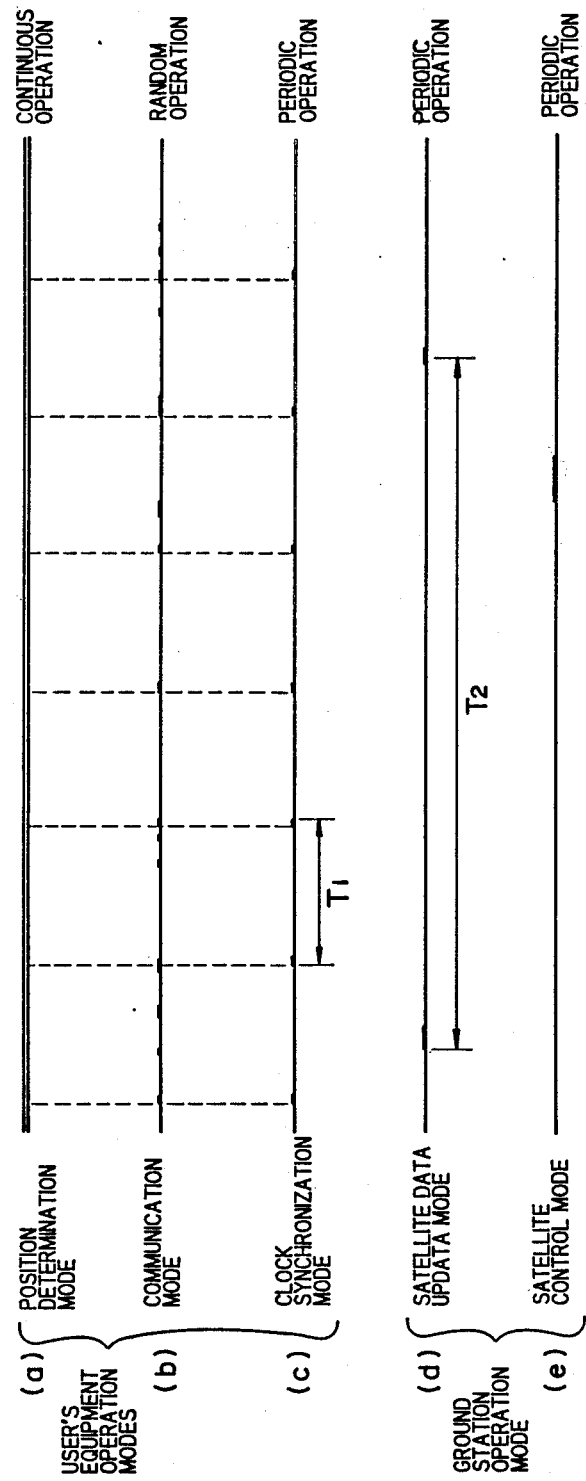
FIG. 4 shows the modes of a system.

FIG. 4 is an example of mode chart showing the operation of a system according to this invention. The user clock synchronization mode is entered intermittently but periodically. This period T depends on the stability of the user clock and the required accuracy, and the frequency (1/T) is several times an hour in this case. The period T of data updating at the ground station and satellite also depends on the accuracy and stability of the satellite clock. This frequency is several times a day in this case. Control of the satellite takes place several times a month as usual practice.

FIG. 3 (b) is a conceptual diagram indicating the action of the system in case of the continuous position-determination mode shown in FIG. 4 (a). It indicates that the hardware enclosed by the bold line is in an operating state. In the continuous position-determination mode, it is prerequisite that the clocks of satellites 1 and user 2 are synchronized with each other. In this mode, the range-finding signals arrive continuously on carrier waves from two or three satellites 1, and user 2 can determine his position.

FIG. 3 (c) is a conceptual diagram indicating the action of the system in case of the user clock synchronization mode shown in FIG. 4 (c). When the user emits the range-finding signal L2R from data/range-finding signal transmitter 11, the signal L2F enters data/range-finding signal receiver 23 of ground station 3 via repeater 5. At the reception of this range-finding signal L2F, user clock synchronization processor 27 starts operation and measures the arrival time.

FIG. 3 (d) is a conceptual diagram indicating the action of the system in case of the communications mode shown in FIG. 4 (b). In this mode, $\Delta ts$, which was detailed under "Principle of this System" above, is sent from ground station 3 to user 21 via satellite 1.

FIG. 5 is a list indicating active/inactive status of the system's functions shown in FIG. 3. For example, active in the navigation mode are satellite 1 PN (Pseudo-random Noise) signal reception processing, satellite 2 PN signal reception processing and satellite 3 PN signal reception processing at the user equipment with the O mark and PN signal transmission and satellite data processing and updating at the satellite system.

Operation of Measurement System

Figure 6:
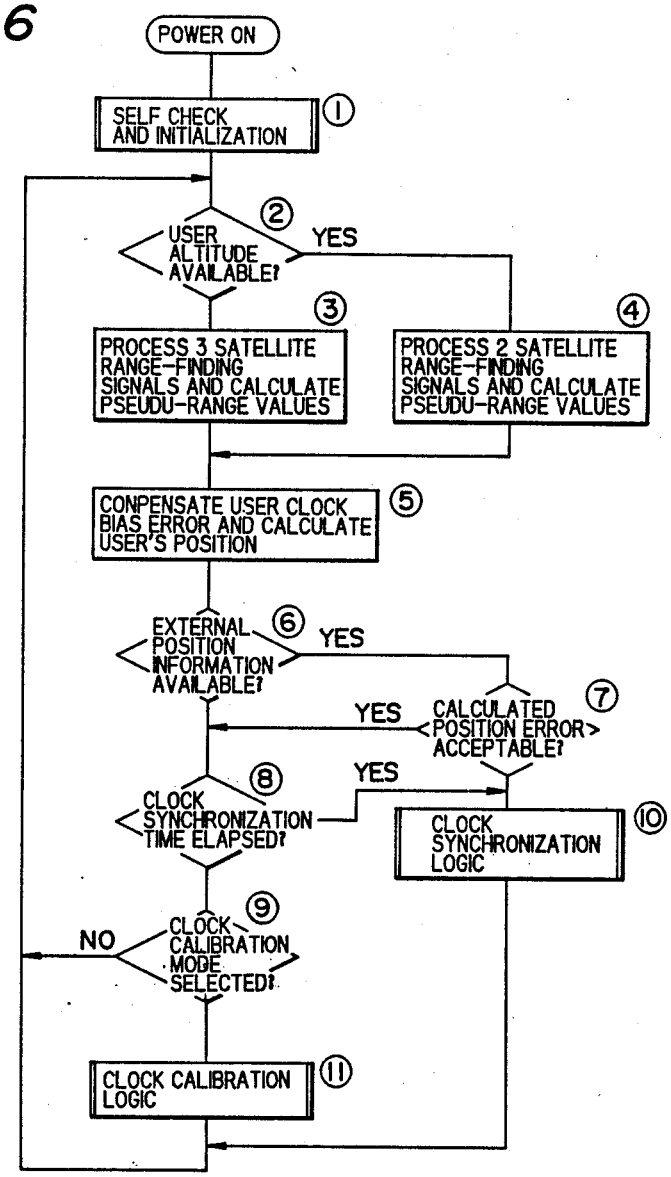
FIG. 6 is a main flowchart indicating the operation of the user's equipment.

FIG. 6 is an example of the main operation flowchart indicating the operation of the user equipment. When started, the initializing routine is entered and initialization takes place (Step 1). On Step 2, the user judges whether altitude information is available, as from an altimeter. If not available, range-finding signals are received from three satellites and a pseudo range is calculated (Step 3). If altitude information is available, range-finding signals are received from two satellites and a pseudo range is calculated from the received signals and this information (Step 4).

On Step 5, the user's clock bias is eliminated and the user's position is calculated. On Step 6, whether present position information is available or not is judged. If available, this position is compared with the position calculated on Step 5 to determine whether within or without allowance (Step 7). That is, whether the difference is an allowable error in performance of this system is judged. If within the allowable value, the user equipment proceeds to Step 8. On Step 8, whether the time interval of clock synchronization has elapsed or not is judged. If the set time interval is over, the user equipment proceeds to Step 10 and synchronizes user clock 12 to clock 7 of satellite 1.

Time interval of clock synchronization depends on at which accuracy the user requires for position determination and on the accuracy of the user clock. On this user equipment, the time interval of synchronization can be set by the user from his terminal as the need arises.

On Step 9, the user can select the clock calibration mode at his option using the operating switch on the user equipment. In the clock calibration mode, the clock is calibrated for bias variation rate on Step 11. Periodical calibration for bias variation rate is useful for improving measurement accuracy. As kinds of user clock error for which calibration is possible and on which calibration has a large effect, there are clock errors related to synchronization, namely, the clock bias error and the clock bias variation rate at which the clock bias varies with time (of course, the same is the case with satellite clocks.)

Figure 7:
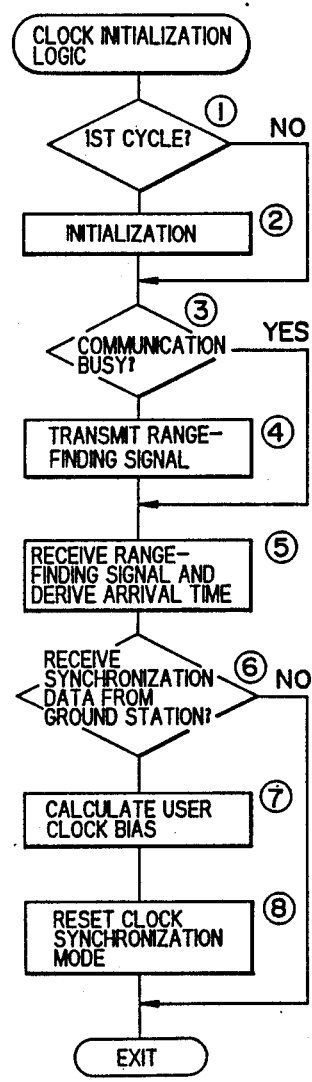
FIG. 7 is a flowchart of synchronization processing of a user clock.

First the clock bias error can be calculated following Step 10 in FIG. 6, namely, the logic in FIG. 7, and may be used for improvement in accuracy of position determination.

Then, the clock bias drift rate determines the principal accuracy of a clock, and even comparatively low cost clocks may be employed as user clocks if they can be calibrated for this kind of error. If the clock bias drift rate is constant, it can be estimated from the tendency to increase of the position value continuously measured at a fixed position. The operator chooses one of the three levels of calibration mode: Coarse, Medium, or Fine, on the display When the time required for calibration corresponding to the chosen level has elapsed, the clock calibration logic estimates the clock error parameter, follows the procedure to use it for measurement processing and terminates this mode.

Clock Synchronization Processing

FIG. 7 shows a flowchart of the user equipment for clock synchronization and corresponds to Step 10 in FIG. 6. First, the user equipment judges whether it is in the first cycle or not and initializes the processor if it is (Steps 1 and 2). On Step 3, the user equipment judges whether its assigned circuit is idle or not and proceeds to Step 4 if idle. On Step 4, it sends data/range-finding signal to data/range-finding signal receiver 23 of ground station 3 via repeater 5 of satellite 1. Ground station 3 receives the range-finding signal from the satellite and calculates the pseudo arrival time (Step 5).

On Step 6, the user equipment judges whether there is a synchronization message from the ground station. It derives the pseudo arrival time between the user and satellite from the message and calculates the clock bias. Then, the clock synchronization mode is released (Step 8).

Clock Calibration Processing

Figure 8:
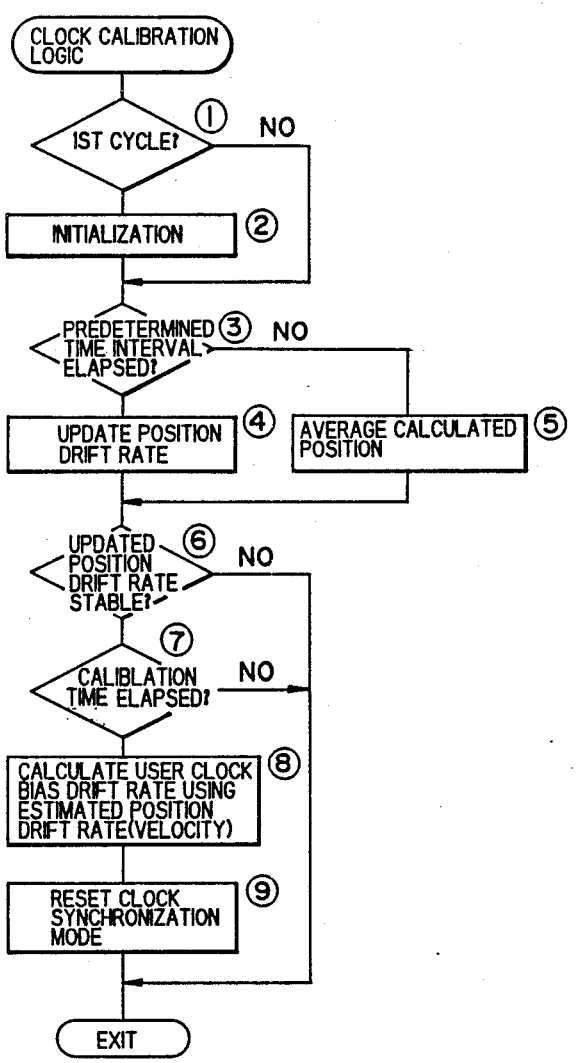
FIG. 8 is a flowchart of user clock calibration processing.

FIG. 8 is a detailed flowchart of the clock calibration logic and corresponds to Step 11 of the flow in FIG. 6. The logic judges whether it is in the first cycle or not and initializes the parameters (Steps 1 and 2).

Besides positional shifts of a satellite with time, irregular range-finding errors occurring within the satellite equipment or user's equipment or in the course of radio wave propagation usually creap into the user-satellite distance derived through the processes in position-determining calculation. Positional shifts of a satellite (shift with respect to a frame of reference fixed to the earth) can be exactly estimated and eliminated by calculation. As to irregular range-finding errors, however, one must rely on the mean of a number of numerical values.

That is to say, if a prescribed time interval (say, 60 seconds) is not reached on Step 3, an arithmetic mean is taken from a number of distance values (ranges) from which the error due to the above-stated positional shift has been eliminated (Step 5). If the prescribed time interval is reached, variation rate of the distance with respect to time (range rate) is updated by calculating a new range rate from the above-stated latest range mean and a past range mean using a filter for range rate derivation (Step 4). As methods of range rate derivation, the iterative (repetitive) least mean square method or a Carman filter is generally used. In this case, whether the estimate of range rate converges at a specific value and whether the estimate is made properly can be judged from the variation of the updated range rate (Step 6).

If not stable enough, control is passed to the main logic which controls the execution of this logic. When appropriate processing has been executed by the main logic, control will be returned to the beginning of this logic. If the estimate of range rate is stable enough and a prescribed calibration time has elapsed (Step 7), a variation rate of clock bias with respect to time is derived by dividing the ultimate value of the above-stated stable range rate by the velocity of light and stored in the user equipment (Step 8). At the same time, this logic terminates its execution by releasing the clock calibration mode (Step 9).

To simply illustrate the principle of calibration of a user clock (calculation of a variation rate with respect to time, and updating, of clock bias), a method using the variation of user-satellite range was detailed in FIG. 8. However, this method does not efficiently utilize the processing logic provided in the user equipment. A simpler method of user clock calibration is described below:

With a user clock's bias variation rate $\Delta \dot{t}B$, the clock bias increases by $\Delta \dot{t}B \times \Delta t$ when a specific time $\Delta t$ has elapsed. That is, let $\Delta tB(t_0)$ be the clock bias at a time point $t_0$, then after a time interval $\Delta t$, the clock bias $\Delta \dot{t}B(t_1 = t_0 + \Delta t)$ at the time $t_1$ $(t_1 = t_0 + \Delta t)$ is $\Delta tB(t_0) + \Delta \dot{t}B \times \Delta t$. In the user equipment, the user's position at the time $t_0$ has been derived and is expressed in terms of horizontal coordinates (Xo, Yo). In the lapse of the time $\Delta t$, namely, at the time point $t_1$ $(t_1 = t_0 + \Delta t)$, the position calculated in the user equipment shifts by the amount of clock bias variation. Let the shifted coordinates be $(X_1, Y_1)$. Here, calculate the user's position according to the pseudo bias value $\Delta t'B$ ($\Delta t'B = \Delta tB(to) + \Delta tc$) and put the results as coordinates $(Xc, Yc)$. The bias variation rate $\Delta t'B$ of the user clock can be derived from a pair of measured coordinates $(Xo, Yo)$ and $(X_1, Y_1)$ thus obtained and coordinates $(Xc, Yc)$ based on a pseudo bias value $\Delta t'B$, using the equation below:

$$\Delta \dot{t}B = [(X_1 - X_0)^2 + (Y_1 - Y_0)^2]^{\frac{1}{2}} / [(Xc - Xo)^2 + (Yc - Yo)^2]^{\frac{1}{2}} \times \Delta tc / \Delta t \times SGN$$

where SGN is $+1$ if $(Xc - Xo) \times (X_1 - Xo) > 0$ and is $-1$ if $(Xc - Xo) \times (X_1 - Xo) < 0$ when, for example, $|Xc - Xo|$ is greater than $|Yc - Yo|$.

The above derivation of a clock bias variation rate is very simple and practical. If the user's position is given exactly, the clock bias $\Delta tB(to)$ can also be calculated at the same time in this calibration mode. That is, assume that the true position of the user has coordinates $(XN, YN)$, then the clock bias error at the time point $t_0$, $\Delta tB(to)$, can be derived from:

$$\Delta \dot{t}B(to) = [(XN - Xo)^2 + (YN - Yo)^2]^{\frac{1}{2}} / [(Xc - Xo)^2 + (Yc - Yo)^2]^{\frac{1}{2}} \times \Delta tc \times SGN$$

Figure 10:
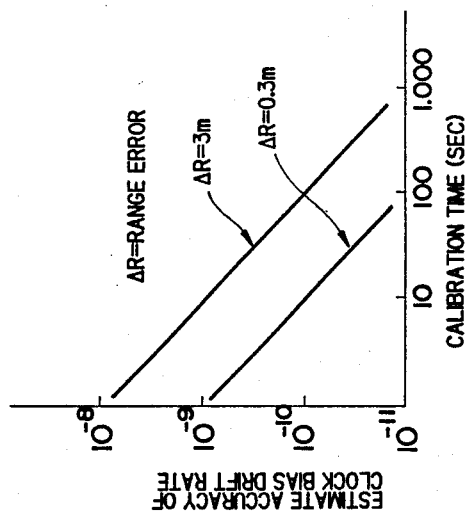
FIG. 10 shows the relationship between calibration time and the accuracy of a drift rate estimate.
Figure 9:
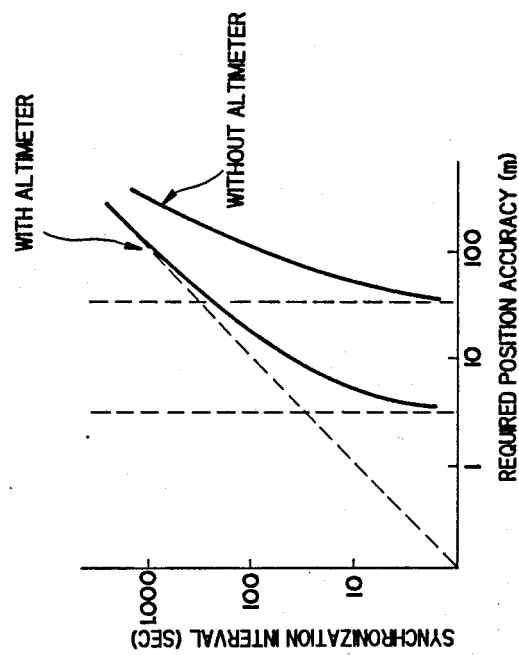
FIG. 9 is a schematic diagram showing the relationship between synchronization interval and position determination accuracy.
Figure 12:
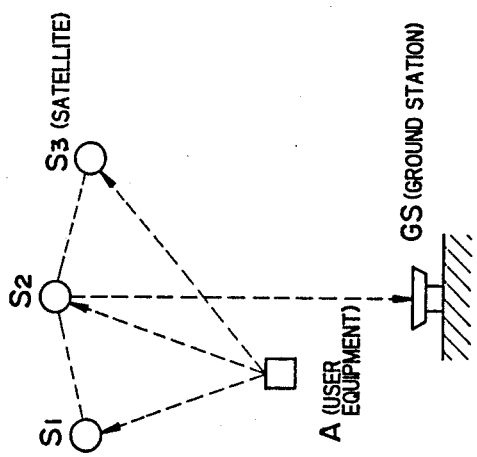
FIGS. 11 and 12 show prior art.
Figure 11:
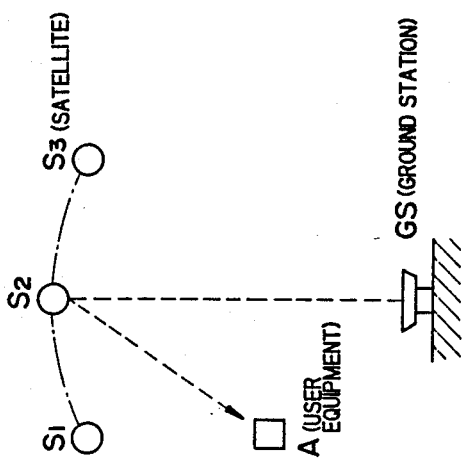

FIG. 9 indicates the conceptual relationship between synchronization interval at the user equipment and required position determination accuracy. It implies that a shorter synchronization interval is necessary for a higher position determination accuracy. FIG. 10 shows the relationships between the calibration interval in the case where the tendency of clock bias error is read by the above-stated procedure and the error is corrected and the drift rate estimate accuracy and the range measurement error. As stated above, this approach allows the clock bias error to be automatically corrected and the correction interval to be set longer.

As detailed above, this invention allows continuous position determination in the region where reception of a range finding signal is possible from at least two satellites. And, position determination became possible with high accuracy even from a moving body without being much influenced by its velocity. Unlike inertial navigation systems, auxiliary information such as initial position and velocity of high accuracy is not needed. Increase in number of satellites deployed in orbit can of course stretch the region where continuous position determination is possible while, within a limited region, continuous position determination is possible with much smaller number of satellites than GPS. This has a great effect on holding down the development and maintenance costs of this system.

Although the present invention has been described through specific terms, it should be noted here that the described embodiment is not necessarily exclusive and various changes and modifications may be imparted thereto without departing from the scope of the invention which is limited solely by the appended claims.

What is claimed is:

1. A satellite-based position-determining system comprising:
   a ground station equipped with a ground receiver, a ground transmitter and a ground clock coupled to said ground receiver and said ground transmitter for generating a ground clock signal;
   at least two satellites deployed in geostationary orbit and each equipped with a satellite receiver, a satellite transmitter and a satellite clock coupled to said satellite receiver and said satellite transmitter for generating a satellite clock signal;
   a user equipment of unknown position equipped with a user clock, a user receiver and a user transmitter for communicating with said satellites, wherein said satellite receiver and said satellite transmitter communicate with said user transmitter and said ground receiver, respectively; and
   means operably coupled to said user receiver for determining the position of said user equipment such that at least one of said satellite transmitters and said user transmitter both emit a range-finding signal toward each other based on respective clock time signals of said satellite clock and said user clock, each of said at least one of said satellite receiver and said user receiver receive each other's range-finding signal and measures each respective arrival time of said range-finding signals based on the respective clock time signals, and a time offset between the satellite and user clock signals is calculated from said measured arrival times to synchronize at least one of said satellite clock signals and said user clock signal and to determine the position of said user's equipment.

2. A satellite-based position-determining system according to claim 1, wherein said arrival times of the range-finding signals are measured at said ground station.

3. A satellite-based position-determining system according to claim 1, wherein said arrival times of the range-finding signals are measured in at least of said satellites.

4. A satellite-based position-determining system according to claim 1, wherein said arrival times of the range-finding signals are measured at said user's equipment itself.

5. A satellite-based position-determining system comprising:
   a ground station equipped with a ground receiver, a ground transmitter and a ground clock coupled to said ground receiver and said ground transmitter for generating a ground clock signal;
   at least two satellites deployed in geostationary orbit and each equipped with a satellite receiver, a satellite transmitter and a satellite clock coupled to said satellite receiver and said satellite transmitter for generating a satellite clock signal;
   a user equipment of unknown position equipped with a user clock, a user receiver and a user transmitter for communicating with said satellites, wherein said satellite receiver and said satellite transmitter communicate with said user transmitter and said ground receiver, respectively; and
   means operably coupled to said user receiver for determining the position of said user's equipment such that at least one of said satellite transmitters and said user transmitter both emit a range-finding signal toward each other based on respective clock time signals of said satellite clock and said user clock, each of said at least one of said satellite receiver and said user receiver receive each other's range-finding signal and measures each respective arrival time of said range-finding signals based on the respective clock time signals, and a time offset between the satellite and user clock signals is calculated from said measured arrival times to synchronize at least one of said satellite clock signals and said user clock signal and to determine the position of said users equipment; and
   means for automatically calibrating an error in the user clock signal by measuring the tendency of said clock signal to diverge while said user equipment is at a fixed position.

* * * * *